United States Patent Office 3,584,093
Patented June 8, 1971

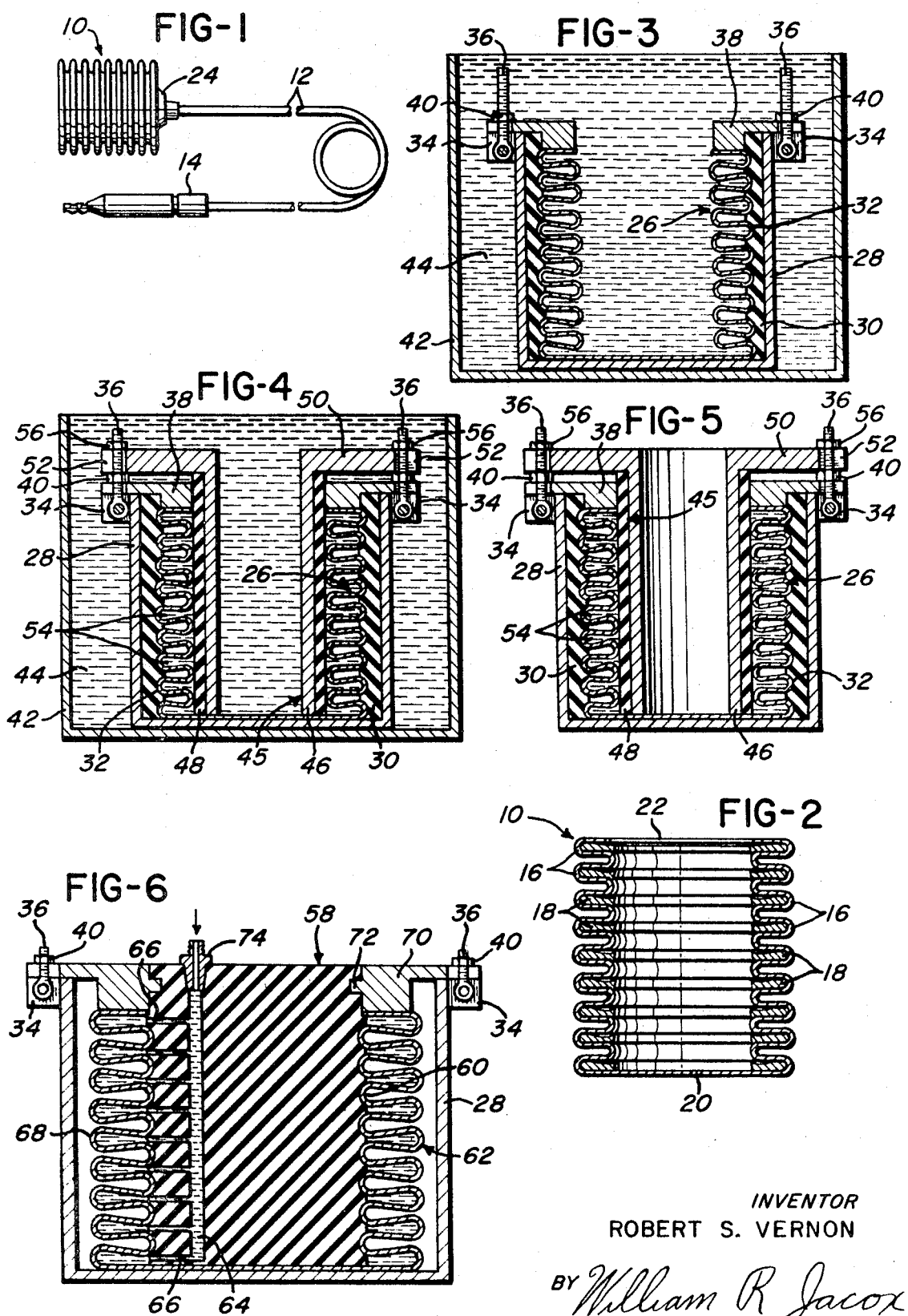

3,584,093
METHOD OF FORMING SPACER RINGS IN THE CONVOLUTIONS OF A BELLOWS
Robert S. Vernon, Lynnfield, Mass., assignor to Standard-Thomson Corporation, Waltham, Mass.
Filed Aug. 27, 1969, Ser. No. 853,268
Int. Cl. B29d 3/00; B29h 9/00
U.S. Cl. 264—101                     5 Claims

ABSTRACT OF THE DISCLOSURE

An improved bellows for reducing the adverse ambient effects which may occur in a temperature responsive system which includes a bulb, bellows, and a capillary tube, all filled with a thermally responsive fluid, or material. In such a system, the bulb serves as the temperature sensing element. By reducing the amount of the fluid in the bellows, the adverse effect of ambient temperature change at the bellows is greatly reduced. Rings are formed within the tips of the convolutions of the bellows to reduce the volume of fluid in the bellows. The rings may be made of metal or elastomeric material or other suitable material. Casting and injection methods are used to form said rings.

BACKGROUND OF THE INVENTION

This invention relates to an improved bellows for use in a temperature responsive system and to the method for production of the bellows.

A thermally responsive bellows system of the type in which this invention is used consists of a bulb and a connecting capillary tube and a bellows, which are all filled with a thermally responsive fluid or material. In a typical application, the bellows is connected by means of a flexible capillary tubing to a bulb which is positioned within a chamber or space or at a location, the temperature of which is to be regulated or sensed. Usually the bulb is in spaced relationship from the bellows. Variations in the temperature of the bulb cause corresponding changes in the volume of the thermally responsive fluid or material therewithin. These changes in the volume of the fluid or material within the bulb are transmitted through fluid or material within the tubing and within the bellows.

Ideally, it is desirable to have the movement of the bellows proportional to the change in volume of the fluid or material in the bulb only. However, expansion or contraction of the bellows is also affected by volumetric changes in the fluid or material located within the capillary tube and within bellows which are located outside the chamber or space to be regulated. Such volumetric change in the fluid within the bellows or tube, of course, results from changes in the temperature of the fluid therewithin. One conventional method of compensating for the effect of these ambient temperature changes is to install a parallel capillary tube equivalent to the length of the tube outside the chamber to be controlled and a second bellows. The volumetric changes which are created in the parallel capillary tube and the second bellows are then automatically substracted from the bellows connected to the bulb to give a movement at the first bellows which more nearly corresponds to changes in the volume of fluid in the bulb located in the chamber to be controlled.

It is obvious that such prior art method of compensating for ambient temperature changes through use of a parallel capillary tube and an extra bellows is rather involved and expensive. The present invention obviates the need for a second bellows and capillary tube to minimize ambient temperature effects.

Accordingly, an object of this invention is to provide an improved bellows construction which is economical to manufacture and within which the adverse effect of ambient temperature change at the bellows is greatly reduced.

Another object of this invention is to provide economical methods for producing a bellows within which such adverse effect of ambient temperature change is greatly reduced.

Other objects and advantages of this invention will become more apparent from the following description and drawings.

BRIEF DESCRIPTION OF THE DRAWINGS

FIG. 1 is a general plan view of a temperature responsive system which includes the improved bellows of this invention.

FIG. 2 is an enlarged cross-sectional view taken through the center of the improved bellows of this invention, showing the bellows in a slightly expanded condition and slightly greater in length than minimum length, with the convolutions thereof filled with filler rings.

FIG. 3 is a cross-sectional view of the bellows and a portion of a ring forming apparatus used in producing the filler rings in the convolutions of the bellows, the bellows and apparatus being immersed in a bath of molten filler material.

FIG. 4 is a view similar to FIG. 3 but shows additional apparatus used in producing the filler rings.

FIG. 5 is a cross-sectional view of the bellows and ring forming apparatus removed from the molten bath of filler material.

FIG. 6 is a cross-sectional view of other apparatus used in forming the filler rings in the convolutions of the bellows according to this invention.

DESCRIPTION OF THE PREFERRED EMBODIMENTS

FIG. 1 is a general plan view of a typical thermally responsive system in which the improved bellows of this invention may be used. The improved bellows 10 is ordinarily made of brass or the like and is connected to one end of a capillary tube 12 which has a passage therethrough which communicates with the interior of the bellows 10. The other end of the tube 12 is connected to a bulb 14 which is disposed within an environment, the temperature of which is to be sensed.

FIG. 2 is a cross-sectional view taken through the center of the bellows 10. The bellows 10 is shown slightly longer than the minimum length thereof. The bellows 10 has convolutions 16 which are filled with filler material which takes the form of annular rings 18, with one such ring being positioned in each of the convolutions 16. When the bellows 10 is compressed to its minimum length shown, the rings 18 completely fill the convolutions 16 from the outer tips thereof to the internal diameter of the roots of the convolutions. When the bellows 10 expands in an axial direction in use, each of the annular rings 18 is loosely retained in its respective convolution 16. The particular bellows 10 illustrated herein has a closed end 20 and an open end 22, as shown in FIG. 2. A connector 24 (FIG. 1) is attached to the open end 22. Each of the rings 18 has a longitudinal axis which is substantially coaxial with the longitudinal axis of the bellows 10.

When the bellows 10 is used in a thermally responsive system of the type shown in FIG. 1, the bellows 10, the capillary tube 12 and the bulb 14 are all filled with a thermally responsive material which may be a solid, or a fluid, or may be a material which changes from a solid to a fluid within a given temperature range.

In some applications, the bulb 14 may be connected directly to the bellows 10, with the bulb 14 and bellows 10 being filled with a thermally responsive material.

By greatly reducing the amount of thermally responsive material in the bellows 10 through the use of the rings 18, the adverse effect of ambient temperature change at the bellows 10 is considerably reduced. The use of the bellows 10 of this invention also provides means whereby the "filled spring rate" of the bellows 10 may be increased by reducing the total amount of fluid necessary in a system utilizing a hydraulically-formed convoluted bellows.

One method of forming the rings 18 inside the convolutions 16 of the bellows 10 (FIG. 2) is shown in FIGS. 3, 4, and 5. A bellows 26 (FIG. 3) is first positioned in a container 28 having an elastomeric sleeve 30 positioned around the inner wall of the container 28 as shown. The container 28 and sleeve 30 are dimensioned so that the outer tips of the convolutions 32 sealingly engage the sleeve 30 when the bellows 26 is forced therein, with the closed end of the bellows 26 resting on the bottom of the container 28.

The outside of the container 28 has at least two diametrically opposed anchor blocks 34 secured thereto near the rim of the container 28. A fastener 36 is pivotally joined to each block 34 as shown, and an annular ring 38, having the cross section shown, is positioned on the upper open end of the bellows 26. A nut 40 on each fastener 36 is used to force the ring 38 against the bellows 26 and thus compress the bellows 26 to its minimum operating length.

The bellows 26 and its container 28 are then placed into a tank 42 which contains a body of molten material 44. The material 44 may be a molten metal, such as babbit, or the like, or the material 44 may be silicone rubber, or the like which is solid within the operating temperature of the bellows 26. Any material selected for the material 44 must not adhere to the bellows 26 and also must be compatible with the thermally responsive fluid used in a thermally responsive system.

After the bellows 26 is fixtured and immersed in the material 44 as shown in FIG. 3 a central core member 45 is inserted into the open end of the bellows 26 as shown in FIG. 4. The central core member 45 comprises a tubular member 46 having an elastomeric sleeve 48 secured to the external diameter thereof. The tubular member 46 depends from an annular plate 50 having diametrically opposed slots 52 therein to receive the fasteners 36. The tubular member 46 and the associated sleeve 48 are dimensioned so as to engage or wipe the roots of the convolutions of the bellows 26, therefore displacing some of the molten bath 44 from the central portion of the bellows 26. Thus, the molten material 44 inside the tips of the convolutions 32, as at 54, is completely confined.

After the core member 45 is inserted in the bellows 26 as described, nuts 56 are used to secure the core member 45 to the container 28, and the whole assembly, as shown in FIG. 5 is removed from the body of material 44 and allowed to cool. Upon cooling, the core member 45 and the annular ring 38 are removed, and the bellows 26 is removed from the container 28. The molten material 44 which has been trapped in the convolutions of the bellows 26 thus becomes the solid annular rings 18 shown in FIG. 2 and the finished bellows shown in FIG. 2 is thus produced.

FIGURE 6

Another method of producing the annular rings 18 in the bellows 10 shown in FIG. 2 is accomplished by using the apparatus shown in FIG. 6. The apparatus includes the container 28, previously described, and a displacement plug 58 which is of elastomeric material and is disposed within a bellows such as a bellows 62, having convolutions 68. The plug 58 is cylindrically shaped and has an outer diameter which is dimensioned so as to sealingly engage or wipe the roots of the convolutions 68 of the bellows 62 as shown at 60, when the plug 58 is inserted therein as shown. The plug 58 has a main vertical passage 64 extending along substantially the entire length thereof and a plurality of horizontally positioned passages 66, each passage 66 having one end thereof communicating with the vertical passage 64. The other end of each passage 66 communicates with the interior of one of the convolutions 68 as the plug 58 is positioned within the bellows 62 and as the bellows 62 is compressed to its minimum operating length. The bellows 62 is compressed to said minimum operating length by an annular ring 70, the fastener 36, and the nut 40, in an arrangement similar to that described above. The ring 70, however, has an annular projection 72 cooperating with a mating recess in the plug 58 to retain the plug 58 in the bellows 62. A suitable adapter 74 is joined to the plug 58 and is used for evacuating the plug 58 and for filling the convolutions 68 of the bellows 62.

After the bellows 62 is fixtured in the apparatus, as shown in FIG. 6, the entire apparatus is placed in an evacuated environment. Then molten filler material is injected into the plug 58, through the adapter 74 and the passages 64 and 66. The entire apparatus must be held at a temperature to maintain the filler material in a molten condition. Thus, the convolutions 68 of the bellows 62 are filled with the molten filler material. Then, the entire apparatus is cooled and the ring 70 and plug 58 are removed from the bellows 62 to produce the finished bellows 10 shown in FIG. 2. If an elastomer, such as silicone rubber, or the like, is injected into the convolutions 68, the bellows 62 must remain compressed in the apparatus of FIG. 6 until the elastomer is cured, in order to produce a bellows such as that shown in FIG. 2.

The invention having thus been described the following is claimed:

1. The method of forming spacer elements within the convolutions of a thermally responsive bellows member which is axially expandable, comprising the steps of:
    (a) compressing said bellows to its minimum working length;
    (b) sealing the convolutions of the compressed bellows at the inner tips of the convolutions and evacuating air from said convolutions;
    (c) depositing molten filler material inside the sealed convolutions of the compressed bellows;
    (d) permitting said molten filler material to solidify to form said spacer elements.

2. The method of claim 1 in which the filler material is metallic and is permitted to cool for solidification thereof.

3. The method of claim 1 in which the filler material is elastomeric and is cured for solidification thereof.

4. The method of forming filler rings within the convolutions of a thermally responsive bellows member which is axially expandable, comprising the steps of:
    (a) inserting said bellows member in a container having a resilient wall so that the outer portions of said convolutions sealingly engage the resilient wall,
    (b) compressing said bellows member in an axial direction to its minimum working length while in said container;
    (c) immersing said bellows member and container in a body of molten filler material;
    (d) inserting a flexible core inside said bellows member while it is immersed in said body of molten filler material so that the core displaces molten filler material within the central portion of the bellows member and sealingly engages the inner portions of said convolutions to trap said molten filler material within said convolutions;
    (e) removing said container, bellows member, and flexible core from said body of molten material and cooling the same; and
    (f) removing said core from said bellows member and said bellows member from said container.

5. The method of forming filler rings within the convolutions of a thermally responsive bellows member which is expandable in an axial direction comprising the steps of:
(a) compressing said bellows member in an axial direction to its minimum working length;
(b) inserting a flexible filler plug within said bellows member so that the outer diameter of the filler plug sealingly engages the inner tips of the convolutions of said bellows member, said filler plug having fluid passage communicating with said convolutions;
(c) evacuating air from said convolutions through said passages;
(d) maintaining said bellows member and the filler plug at the temperature of a molten filler material while forcing said molten filler material into the passages and into the convolutions;
(e) hardening said filler material.

References Cited
UNITED STATES PATENTS

| | | | |
|---|---|---|---|
| 2,572,438 | 10/1951 | Branson | 264—267X |
| 2,781,565 | 2/1957 | Atchison | 29—454UX |
| 2,800,321 | 7/1957 | Jarret et al. | 264—267X |
| 2,920,656 | 1/1960 | Bertolet | 92—42 |
| 3,143,794 | 8/1964 | Martin-Hurst | 29—454 |

FOREIGN PATENTS 513,565  11/1930  Germany.

CHARLIE T. MOON, Primary Examiner

U.S. Cl. X.R.

29—530; 92—42; 164—91; 264—267